United States Patent Office 3,317,520
Patented May 2, 1967

3,317,520
STEROIDO[20,21-c]PYRAZOLES AND
INTERMEDIATES
Raymond O. Clinton, East Greenbush, N.Y., assignor to
Sterling Drug Inc., New York, N.Y., a corporation of
Delaware
No Drawing. Filed Mar. 5, 1965, Ser. No. 437,590
9 Claims. (Cl. 260—239.5)

This invention relates to new heterocyclic steroids and in particular is concerned with steroids of the pregnane series having a pyrazole ring fused to the 20,21-position and with intermediates in the preparation thereof.

One aspect of the invention relates to compounds of the formula

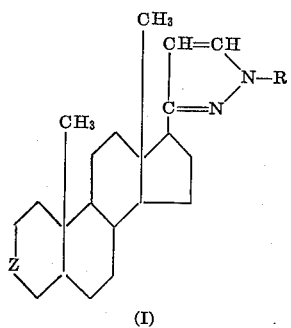

wherein R is hydrogen, carbamyl or acyl, and Z is CH(OH), CH(Oacyl) or C=O, acyl in each instance being carboxylic acyl having from one to ten carbon atoms. Also included are compounds of Formula I having a double bond in the 4,5-position, Z being C=O, and compounds of Formula I having a double bond in the 5,6-position, Z being other than C=O, that is, where Z is CH(OH) or CH(Oacyl).

The compounds of Formula I can belong to either the 5β-pregnane or 5α-pregnane (allopregnane) series; and in compounds where Z is CH(OH) or CH(Oacyl), the 3-oxy substituent can be in either the α- or β-configuration.

The term "acyl" as used herein refers to acyl radicals derived from carboxylic acids having from one to ten carbon atoms and a molecular weight less than 200. Representative of the acyl radicals which can be present are lower-alkanoyl, e.g., formyl, isobutyryl, caproyl, heptanoyl, octanoyl, trimethylacetyl, and the like; carboxy-lower-alkanoyl, e.g., succinyl (β-carboxypropionyl); cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; and pyridylcarbonyl, e.g., nicotinoyl and isonicotinoyl. In acyl radicals containing a phenyl group, the latter can be unsubstituted or substituted by any number and kind of substituents inert under the reaction conditions used, including alower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can have from one to four carbon atoms.

The compounds of Formula I are prepared from compounds of the formula

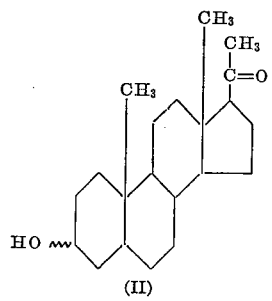

and 5,6-unsaturated analogs thereof. A hydroxymethylene group is introduced into the 21-position of a compound of Formula II by reacting the latter with ethyl formate in the presence of a strong base such as an alkali metal alkoxide or hydride. The resulting 21-hydroxymethylene derivative is then reacted with hydrazine to give a compound of Formula I wherein R is H and Z is CH(OH).

The compounds of Formula I where Z is CH(Oacyl) and/or R is acyl are prepared from the corresponding compounds where Z is CH(OH) and/or R is hydrogen, respectively, by conventional esterification or amidation reactions, as by treating with an acid anhydride or an acid halide in a tertiary-amine solvent such as pyridine.

The compounds of Formula I where Z is C=O are prepared from the corresponding compounds where Z is CH(OH) by conventional oxidation reactions, as with chromic oxide or by the Oppenauer method.

The compounds of Formula I wherein R is carbamyl are prepared by reacting the corresponding compounds where R is hydrogen with cyanic acid.

As a matter of convenience the compounds of the invention are depicted as having the structure of Formula I, although it is to be understood that the compounds may assume an alternative isomeric structure, viz.:

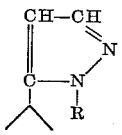

and that said isomeric structure is within the purview of the invention.

Another aspect of the invention relates to compounds of the formula

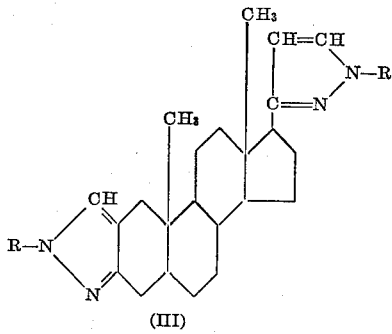

wherein R is hydrogen, carbamyl or acyl, acyl having the meaning given hereinabove. Also included are compounds of Formula III having a double bond in the 4,5-position.

The compounds of Formula III are prepared from compounds of the formula

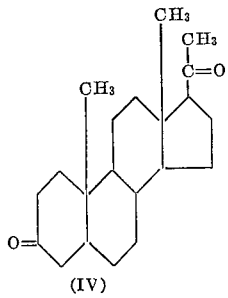

(IV)

and 5,6-unsaturated analogs thereof. Hydroxymethylene groups are introduced into both of the 2- and the 21-positions by the process described above. The resulting 2,21-bis(hydroxymethylene) derivative is then reacted with hydrazine to give a compound of Formula III where R is H. The compounds of Formula III where R is carbamyl or acyl are prepared by the amidation reactions described above in connection with the preparation of compounds of Formula I.

As in the case of Formula I, Formula III is representative of the possible isomeric forms of the pyrazole rings.

Still another aspect of the invention relates to compounds having the formula

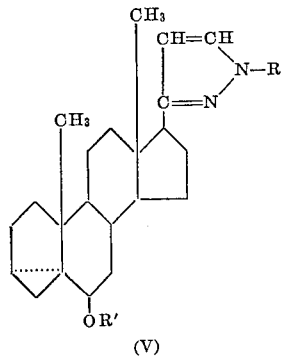

(V)

wherein R is hydrogen, carbamyl or acyl, and R' is hydrogen or acyl, acyl having the meaning given hereinabove.

The compounds of Formula V are prepared by forming the 21-hydroxymethylene derivative of 3α,5α-cyclopregnan-6β-ol-20-one, reacting the latter with hydrazine, and, if desired, esterifying or amidating the resulting 6β-hydroxy-3α,5α-cyclopregnano[20,21-c]pyrazole.

The compounds of Formulas I, III and V where R is hydrogen are basic in nature and thus form acid-addition salts when treated with a moderate to strong inorganic or organic acid. These salts are the full equivalent of the corresponding free bases insofar as the physiological properties inherent in the cation are concerned. Both the free base and salt forms are considered to be one and the same invention.

The structures of the compounds of the invention were established by the modes of synthesis, by elementary analysis and by ultraviolet and infrared spectral data.

The compounds of Formulas I, III and V are useful because of their endocrinological and pharmacological properties. Such properties include anti-inflammatory and coronary dilator activities.

The following examples will further illustrate the invention without the latter being limited thereby.

*Example 1*

(a) *21 - hydroxymethylene-5-pregnen-3β-ol-20-one.—* 5-pregnen-3β-ol-20-one (30.0 g.) was dissolved in 2400 ml. of benzene, and 200 ml. of solvent was removed to ensure anhydrous conditions. Sodium hydride (12.5 g.) was then added, followed by careful addition of 20 ml. of absolute methanol over a period of one hour. Ethyl formate (30 ml.) was then added and the mixture was stirred for 2 days at room temperature. Methanol (10 ml.) was added to the reaction mixture followed by 1 liter of water. The solid product was collected and treated with a mixture of ice and hydrochloric acid. The acidified product was collected and dried to give 30.5 g. of 21-hydroxymethylene-5-pregnen-3β-ol-20-one (reddish-amber ferric chloride test).

By replacing the 5-pregnen-3β-ol-20-one in the foregoing preparation by a molar equivalent amount of 5β-pregnan-3α-ol-20-one or 5α-pregnan-3β-ol-20-one, there can be prepared, respectively, 21-hydroxymethylene-5β-pregnan-3α-ol-20-one or 21-hydroxymethylene-5α-pregnan-3β-ol-20-one.

(b) *3β-hydroxy-5-pregneno[20,21-c]pyrazole* [I; R is H, Z is CH(OH-β), Δ$^5$].—A mixture of 10.0 g. of 21-hydroxymethylene-5-pregnen-3β-ol-20-one, 1.6 ml. of hydrazine hydrate and 400 ml. of methanol was heated at reflux on a steam bath for 30 minutes. After 3 days at room temperature the reaction mixture was concentrated to dryness, and the residue was chromatographed on a column of 380 g. of silica gel.

The chromatograph column was eluted with benzene and then with benzene-ether mixtures containing gradually increasing amounts of ether. The fractions brought out by benzene-ether (4:1) were recrystallized successively from acetone, ethyl acetate and ether to give 21-dimethoxymethyl - 5 - pregnen - 3β-ol-20-one, colorless needles, M.P. 122.4–122.8° C. (corr.); $[\alpha]_D^{25} = +38.9°$ (1% in chloroform); ultraviolet maximum at 286 mμ (95% ethanol); infrared absorption at 2.87, 3.43, 5.86 and 6.00μ.

The fractions brought out by benzene-ether (1:1) were recrystallized several times from methanol to give 3β-hydroxy-5-pregneno[20,21-c]pyrazole, M.P. 229.8–236.4° C. (corr.); $[\alpha]_D^{25} = -69.2°$ (1% in chloroform); infrared absorption at 3.11, 3.44, 6.00, 6.10, 6.13, 6.52 and 6.82μ.

By replacing the 21-hydroxymethylene-5-pregnen-3β-ol-20-one in the foregoing preparation by a molar equivalent amount of 21-hydroxymethylene-5β-pregnan-3α-ol-2-one or 21-hydroxymethylene-5α-pregnan - 3β - ol-3-one, there can be obtained, respectively, 3α-hydroxy-5β-pregnano[20,21-c]pyrazole [I; R is H, Z is CH(OH-α), 5β-H] or 3β-hydroxy-5α-pregnano[20,21-c]pyrazole [I; R is H, Z is CH(OH-β), 5α-H].

(c) *3β-hydroxy-5-pregneno[20,21-c]pyrazole* was also prepared from 21-dimethoxymethyl-5-pregnen-3β-ol-20-one (the dimethyl acetal of 21-hydroxymethylene-5-pregnen-3β-ol-20-one) and hydrazine as follows: A mixture of 400 mg. of 21-dimethoxymethyl-5-pregnen-3β-ol-20-one. 133 mg. of hydrazine sulfate and 30 ml. of 95% ethanol was heated on a steam bath and 10 ml. of water was added to complete solution. The reaction mixture was refluxed gently for one hour while allowing it to concentrate. The precipitate which formed was collected and recrystallized from methanol containing a trace of pyridine. There was thus obtained 3β-hydroxy-5-pregneno[20,21-c]pyrazole in the form of colorless plates, identical with the product obtained in part (b) above.

*Example 2*

*N - carbamyl-3β-hydroxy-5-pregneno[20,21-c]pyrazole* [I; R is CONH$_2$, Z is CH(OH-β), Δ$^5$] can be prepared by treating an aqueous methanolic solution of 3β-hydroxy-5-pregneno[20,21-c]pyrazole first with ethereal hydrogen chloride and then with aqueous potassium cyanate.

*Example 3*

*N-carbamyl-3-oxo-4-pregneno[20,21-c]pyrazole* [I; R is CONH$_2$, Z is C=O, Δ$^4$] can be prepared by treating N-carbamyl-3β-hydroxy-5-pregneno[20,21]pyrazole with chromic oxide in acetic acid. Further treatment of the product by heating it at reflux for several hours with ethanolic hydrochloric acid produces 3-oxo-4-pregneno [20,21-c]pyrazole [I; R is H, Z is C=O, Δ⁴].

*Example 4*

N-acetyl-3β-acetoxy-5-pregneno[20,21-c]pyrazole [I; R is COCH₃, Z is CH(OCOCH₃-β), Δ⁵] can be prepared by heating on a steam bath for several hours a solution of 3β-hydroxy-5-pregneno[20,21-c]pyrazole and acetic anhydride in pyridine. By replacing the acetic anhydride with butyric anhydride or benzoyl chloride, there can be prepared, respectively, N - butyryl-3β-butyryloxy-5-pregneno[20,21-c]pyrazole or N-benzoyl - 3β - benzoyloxy-5-pregneno[20,21-c]pyrazole.

*Example 5*

(a) *2,21 - bis(hydroxymethylene) - 4 - pregnene-3,20-dione.*—Ethyl formate (10 ml.) was added to a solution of 10.0 g. of progesterone in 400 ml. of benzene, followed by 3.0 g. of sodium hydride, all under a nitrogen atmosphere. After two days at room temperature, 0.5 g. of additional sodium hydride was added. After standing for seven days longer, the reaction mixture was treated with 10 ml. of methanol and 400 ml. of water. The aqueous layer was separated, washed with ether, and made acid with ice and hydrochloric acid. The solid product was collected by filtration to give 5.85 g. of 2,21-bis(hydroxymethylene) - 4 - pregnene-3,20-dione, used directly for conversion to the pyrazole.

By replacing the progesterone in the foregoing preparation by a molar equivalent amount of 5α-pregnane-3,20-dione or 5β-pregnane-3,20-dione, there can be prepared, respectivley, 2,21-bis(hydroxymethylene)-5α-pregnane-3,20 - dione or 2,21 - bis - (hydroxymethylene)-5β-pregnane-3,20-dione.

(b) *4-pregneno[3,2-c][20,21-c]dipyrazole* [III; R is H, Δ⁴].—A mixture of 5.85 g. of 2,21-bis(hydroxymethylene)-4-pregnene-3,20-dione, 1.5 ml. of hydrazine hydrate and 50 ml. of methanol was heated at reflux on a steam bath for three hours. The reaction mixture was concentrated and the product separated to give 2.06 g. of 4-pregneno[3,2-c][20,21-c]-dipyrazole, M.P. 218–235° C. (uncorr.); ultraviolet maximum at 261 mµ

(ε=10,200)

shoulder at 240 mµ (ε=9,240); infrared absorption at 3.00, 3.14, 3.44, 6.15, 6.36 and 6.88µ.

By replacing the 2,21-bis(hydroxymethylene)-4-pregnene-3,20-dione in the foregoing preparation by a molar equivalent amount of 2,21-bis(hydroxymethylene)-5α-pregnane-3,20-dione or 2,21-bis(hydroxymethylene)-5β-pregnane-3,20-dione, there can be obtained, respectively, 5α-pregnano[3,2-c][20,21-c]-dipyrazole [III; R is H, 5α-H] or 5β-pregnano[3,2-c][20,21-c]-dipyrazole [III; R is H, 5β-H].

4-pregneno[3,2-c][20,21-c]di-(N - carbamylpyrazole) [III; R is CONH₂, Δ⁴] can be prepared from 4-pregneno[3,2-c][20,21-c]-dipyrazole and cyanic acid by the procedure described above in Example 2.

4-pregneno[3,2-c][20,21-c]di(N-acetylpyrazole) [III; R is COCH₃, Δ⁴] can be prepared from 4-pregneno[3,2-c][20,21-c]-dipyrazole and acetic anhydride by the procedure described above in Example 4.

*Example 6*

*21-hydroxymethylene - 3α,5α - cyclopregnan-6β-ol-20-one.*—Sodium methoxide (3.5 g.) and 20 ml. of ethyl formate were added to a solution of 8.93 g. of 3α,5α-cyclopregnan-6β-ol-20-one in 100 ml. of pyridine. The reaction mixture was stirred under nitrogen for about fifteen hours and then concentrated in vacuo. The residue was dissolved in 500 ml. of water and the solution filtered. The filtrate was acidified with a buffer solution made up of 315 ml. of 0.7 M disodium hydrogen phosphate and 59 ml. of 0.7 M potassium dihydrogen phosphate. The product was extracted with ethyl acetate, and the extracts were dried and concentrated to give 21-hydroxymethylene - 3α,5α - cyclopregnan - 6β-ol-20-one; ultraviolet maxima at 222 and 306 mµ (ε=2,100, 2,600); infrared absorption at 2.93, 3.30, 3.44, 5.90 and 6.17µ.

(b) *6β-hydroxy-3α,5α-cyclopregnano[20,21-c]pyrazole* [V; R and R' are H] was prepared from 4.7 g. of 21-hydroxymethylene-3α,5α-cyclopregnan-6β-ol-20-one and 0.75 g. of hydrazine hydrate in 40 ml. of 95% ethanol, heated at reflux for six hours, and had the M.P. 224–235° C. (uncorr.); ultraviolet maximum at 221 mµ (ε=4,700, 95% ethanol); infrared absorption at 3.04, 3.42, 5.98, 6.15, 6.21 and 6.32µ.

N - carbamyl-6β-hydroxy-3α,5α - cyclopregnano[20,21-c]-pyrazole [V; R is CONH₂, R' is H] can be prepared from 6β-hydroxy-3α,5α - cyclopregnano[20,21-c]pyrazole and cyanic acid by the procedure described in Example 2.

N-acetyl-6β-acetoxy - 3α,5α - cyclopregnano[20,21-c]-pyrazole [V; R and R' are COCH₃] can be prepared from 6β-hydroxy - 3α,5α - cyclopregnano[20,21-c]pyrazole and acetic anhydride by the procedure described above in Example 4.

I claim:

1. A compound selected from the group consisting of (A) compounds of the formula

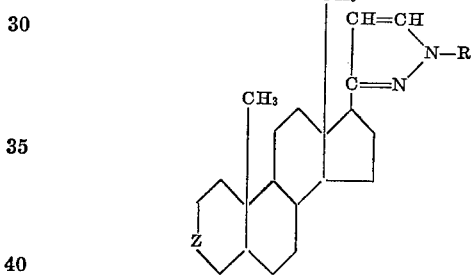

wherein R is a member of the group consisting of hydrogen, carbamyl and acyl, and Z is a member of the group consisting of CH(OH), CH(Oacyl) and C=O; (B) compounds of the above formula having a double bond in the 4,5-position, Z being C=O; and (C) compounds of the above formula having a double bond in the 5,6-position, Z being CH(OH) or CH(Oacyl); acyl in each instance being carboxylic acyl having from one to ten carbon atoms.

2. 3β-hydroxy-5-pregneno[20,21-c]pyrazole.
3. 21-(dimethoxymethyl)-5-pregnen-3β-ol-20-one.
4. A compound selected from the group consisting of (A) compounds of the formula

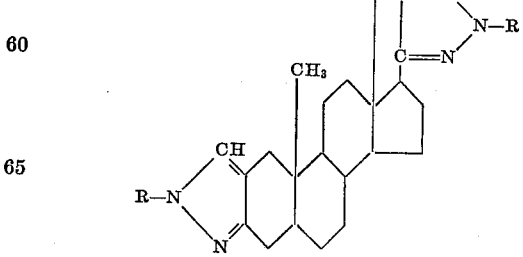

wherein R is a member of the group consisting of hydrogen, carbamyl and carboxylic acyl having from one to ten carbon atoms; and (B) compounds of the above formula having a double bond in the 4,5-position.

5. 4-pregneno[3,2-c][20,21-c]dipyrazole.

6. 2,21-bis(hydroxymethylene)-4-pregnene-3,20-dione.
7. A compound of the formula

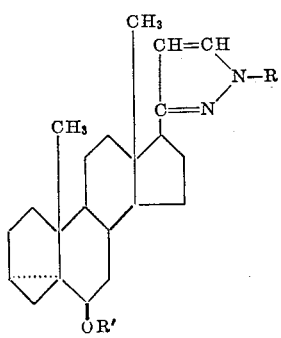

wherein R is a member of the group consisting of hydrogen, carbamyl and acyl, and R' is a member of the group consisting of hydrogen and acyl, acyl in each instance being carboxylic acyl having from one to ten carbon atoms.

8. 6β-hydroxy-3α,5α-cyclopregnano[20,21-c]pyrazole.
9. 21-hydroxymethylene - 3α,5α - cyclopregnan-6β-ol-20-one.

References Cited by the Examiner

Sciaky et al.: Tetrahedron Letters, No. 28, pp. 1839–1845, July 1964, page 1841 relied on.

LEWIS GOTTS, *Primary Examiner.*

HENRY A. FRENCH, *Assistant Examiner.*